United States Patent [19]

Eberhardt

[11] Patent Number: 5,382,784
[45] Date of Patent: Jan. 17, 1995

[54] HAND-HELD DUAL TECHNOLOGY IDENTIFICATION TAG READING HEAD

[75] Inventor: Noel H. Eberhardt, Cupertino, Calif.

[73] Assignee: Indala Corporation, San Jose, Calif.

[21] Appl. No.: 14,523

[22] Filed: Feb. 8, 1993

[51] Int. Cl.⁶ .................................................. G06F 7/10
[52] U.S. Cl. ...................................... 235/472; 235/383; 235/454
[58] Field of Search ........................ 235/472, 383, 454

[56] References Cited

U.S. PATENT DOCUMENTS 5,216,233  6/1993  Main et al. ............................ 235/472

Primary Examiner—Harold Pitts
Attorney, Agent, or Firm—Spencer, Frank & Schneider

[57] ABSTRACT

A hand-held dual reading head including a hand-held housing having a light transmissive window at one end thereof; and containing an actuatable bar-code reader, which produces a light beam which exits the housing via the window and detects light from the beam reflected from a bar code tag to generate a first electrical signal corresponding to bar code data read from the tag. The housing also contains an actuatable radio frequency tag reader which includes a transmit/receive coil mounted adjacent the one end of the housing containing the window, for producing a radio frequency signal of a first frequency to energize a radio frequency transponder-type identification tag and for receiving an identifying signal of a second frequency transmitted by an energized radio frequency identification tag to provide a second electrical output signal corresponding to the tag identifying signal, preferably in the same signal format as the bar-code data. The reading head has a common signal output connected to receive the first and second electrical signals, and a manually actuatable switch arrangement mounted on the housing for selectively actuating one of the bar-code tag reader and the radio frequency tag reader depending on the type tag to be read. Preferably, the housing is gun-shaped and the switch arrangement is a trigger-like normally OFF switch with two ON positions, one for each of the readers.

11 Claims, 4 Drawing Sheets

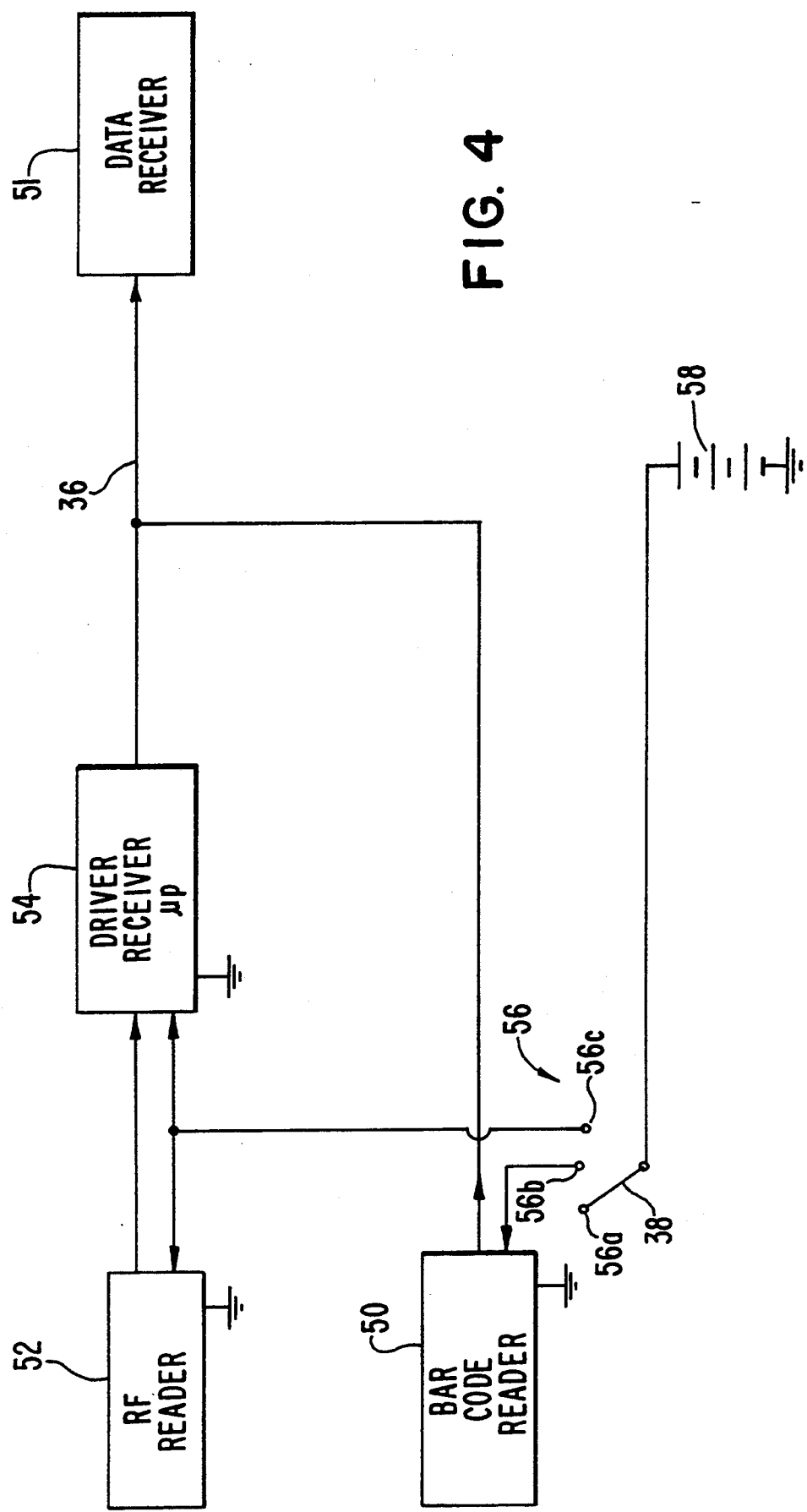

1

HAND-HELD DUAL TECHNOLOGY IDENTIFICATION TAG READING HEAD

BACKGROUND OF THE INVENTION

The present invention relates to a hand-held reading head for reading coded identification tags. More specifically, the present invention relates to a hand-held reading head for reading identification tags attached to an object, which tags are either of the bar code type or of the radio frequency signal type.

It is well known to place identifying tags on objects so that the objects can be identified for various purposes. Such identification tags may be, for example, of the bar code type when the bar code is scanned by a light source, in particular a laser light source, and the varying intensity of the light reflected from the bar code tag is then detected to provide a signal indicative of the bar code. This identification signal is commonly fed to a data receiver or host computer to identify the object and/or take some further action. In a similar manner, a radio frequency identification tag may be fixed to an object with the tag normally being of a passive nature which, in response to an interrogating signal, emits a radio frequency signal which is coded to identify the object. In either case, the identification code may a code which is unique to the specific object and/or for example, may indicate a particular owner for a group of such objects. In another example of the latter type situation which is of particular importance, the identifying tags may be affixed to garments or textile objects such as towels or linens in a commercial cleaning establishment so that the textile articles can be separated and identified as to the owner following washing or dry cleaning.

At the present time, both bar code type tags and, more recently and in increasing numbers, radio frequency identification tags are being affixed to such textile type articles. However, the readers presently available can only read either bar code or the radio frequency identifying signal. Thus, if articles containing the two different types of tags are intermingled and simultaneously processed, and subsequently are to be identified, this requires two different types of readers, and in particular hand-held readers. Such a procedure is obviously time consuming and costly.

It is therefore the object of the present invention to overcome the above stated problem regarding the two different types of readers which may be required.

SUMMARY OF THE INVENTION

The above object generally is achieved according to the present invention by a hand-held dual technology code reading head which comprises: a hand-held housing having a light transmissive window at one end thereof; an actuatable bar code reader disposed in the housing and including a light source for producing a beam of light directed along a path to exit the housing via the window toward a bar-code tag, scanning means for scanning the light beam along a scan line across the bar code tag and a light sensor for detecting the intensity of light from the light beam reflected from a bar code and for producing an electrical signal corresponding thereto; an actuatable radio frequency tag reader for producing a radio frequency signal of a first frequency for energizing a radio frequency identification tag and for detecting a radio frequency identifying signal of a second frequency produced by an energized radio frequency tag and for producing a corresponding output signal, with the radio frequency tag reader being disposed in the housing and including a coil which is mounted within the housing at the one end of the housing containing the window so as to avoid the light path and circuit means connected to the coil for producing the corresponding output signal; and means, which are manually actuatable by a user of the reading head, for selectively actuating one of the bar code reader and the radio frequency tag reader.

According to a further feature of the invention, the means for selectively actuating comprises a switch arrangement positioned on the housing for actuation by a single finger of a user, and preferably is a normally OFF three position trigger-like switch.

According to the preferred embodiment of the invention, the hand-held dual technology reading head further comprises further circuit means for converting the output signal from the radio frequency reader to a format corresponding to that of the output signal from the bar-code reader, and the reading head is provided with a common output for the output signals from the bar-code reader and from the further circuit means.

BRIEF DESCRIPTION OF THE DRAWINGS

FIG. 4 is a schematic block diagram of the circuit of the preferred embodiment of the reading head according to the invention.

DETAILED DESCRIPTION OF THE PREFERRED EMBODIMENTS

Figure 1:
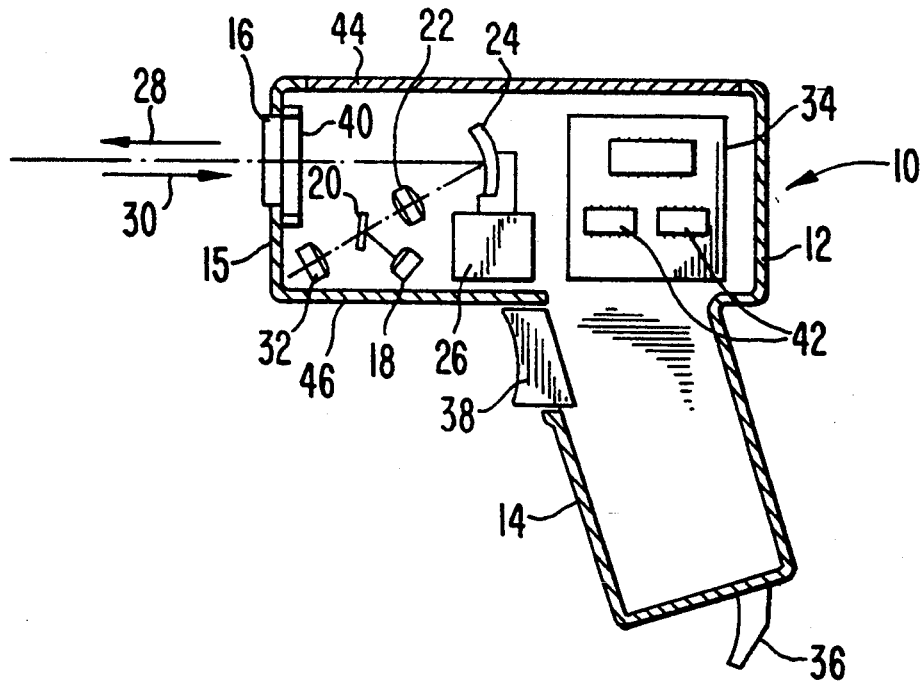
FIG. 1 is a schematic cross-sectional view of a hand-held reading head according to the invention which is capable of reading both bar coded tags and radio frequency identification tags.
Figure 2:
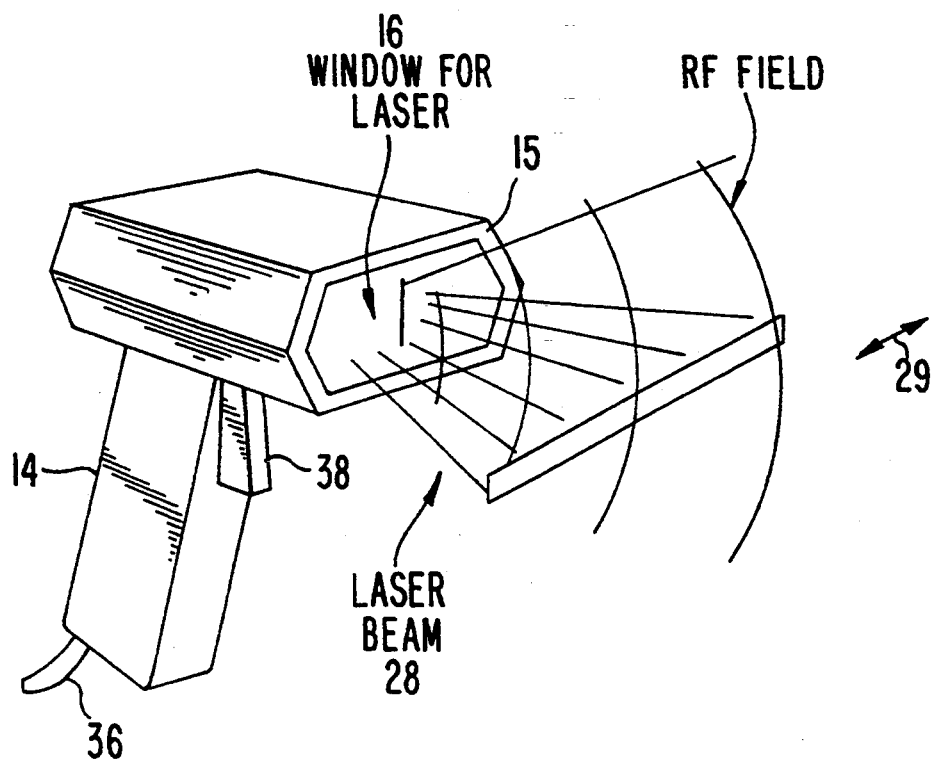
FIG. 2 is a isometric view of a hand-held reading head according to the invention.

Referring now to FIGS. 1 and 2, there is shown a reading head according to the invention which can be utilized to selectively read either a bar code tag or a radio frequency identification tag. As shown in the figures, the head includes a generally pistol-shaped housing 10 including an elongated portion 12 and a handle portion 14 extending transverse to the elongated portion 12. One end surface 15 of the elongated portion 12 is provided with a light transmissive window 16.

In order to read a bar code tag, a known bar code reader is disposed within the housing 10. This bar code reader is of conventional design and, for example, may include a light source 18, for example a laser diode, for producing a beam of light which as shown is directed onto a partially silvered mirror 20 which directs the light through a suitable culminating and focussing lens 22 onto an oscillating mirror 24 attached to a scanning motor 26. The light beam reflected from the oscillating mirror 24 leaves the housing 10 via the window 16 to form an outgoing light beam 28. This beam 28 is directed toward a bar code tag and scanned along same in a direction 29 as shown in FIG. 2 and the light 30 reflected from a bar code tag re-enters the housing 10 via the window 16 and is detected by a detector 32 to provide an output signal corresponding to the change in intensity of the reflected beam 30 caused by the scan across the bar code tag. The analog signal at the output of the detector 32 is fed to a circuit 34 which, in a known manner, converts the analog output signal of the detector 32 to a digital signal corresponding to the identifying signal represented by the bar code which has been read. This signal is then fed to a host computer or data receiver via a cable 36 for processing of the data represented by the identifying signal.

The electric power for operating the bar code reader thus far described may be either a battery contained within the handle portion 14 or may be received via the cable 36. Actuation of the motor 26, the light source 18 and the remainder of the circuitry of the code reader is controlled by a trigger-like switch 38 mounted in the housing 10. A bar code reader operating in the manner thus far described is known in the art and may, for example, be a reader of the type disclosed for example in U.S. Pat. No. 4,806,742 or U.S. Pat. No. 5,157,687.

In order to be able to selectively read a radio frequency identifying tag, a radio frequency tag reader is likewise disposed and mounted in the housing 10. Such a radio frequency (RF) reader generally includes a coil 40 which is mounted in the housing adjacent the end 15 containing the window 16 and positioned so that it will not interfere with the scanned light beam exiting the window 16. This coil 40 is connected to a circuit 42 which is likewise mounted within the housing 10, and which in a known manner, when actuated, to causes the generation of a radio frequency field around the end 15 of the housing containing the window 16 so that the gun-like housing 10 may likewise be pointed at a radio frequency identification tag so as to couple the field to the tag. In a known manner, the reader for a radio frequency tag or transponder normally generates an interrogating signal of a first frequency which is coupled to the tag via the coil 40 to energize the tag and cause same to produce a radio frequency identifying signal of a second different frequency which is then detected by the coil 40 and fed to the circuit 42 for processing. Radio frequency identification tags and readers of this general type are well known, and may for example be of the type disclosed in commonly assigned U.S. Pat. No. 5,099,227 (but utilizing only magnetic coupling) whereas the reader circuitry may generally be of the type sold by the Assignee, Indala Corporation, under the Trademark "RAPID ID", for example a reader model MHK-103.

Figure 3A:
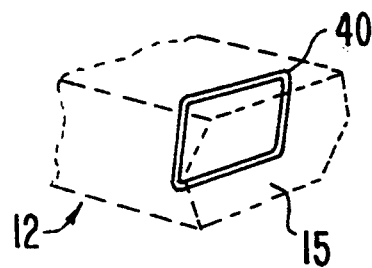
FIGS. 3a to 3f show different orientations and arrangements of the coil for the radio frequency identification tag reader in the dual reading head according to the invention.
Figure 3B:
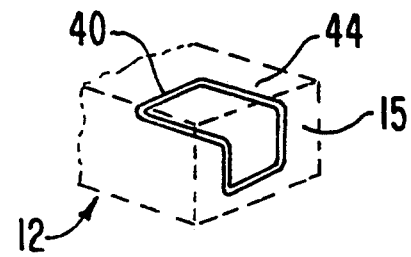
Figure 3C:
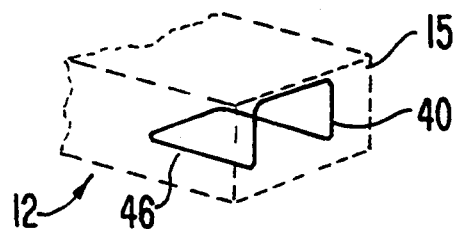
Figure 3D:
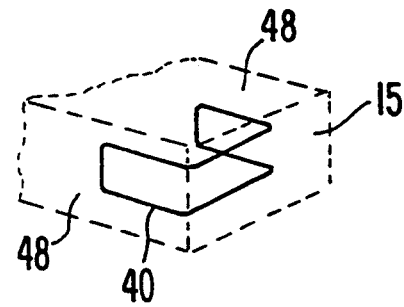
Figure 3E:
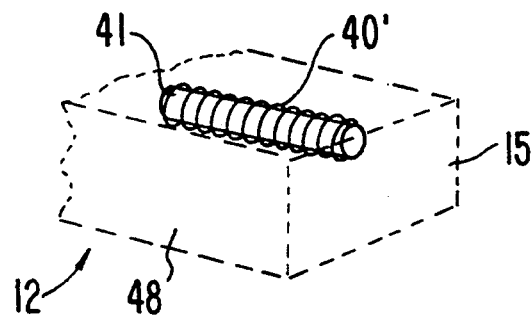
Figure 3F:
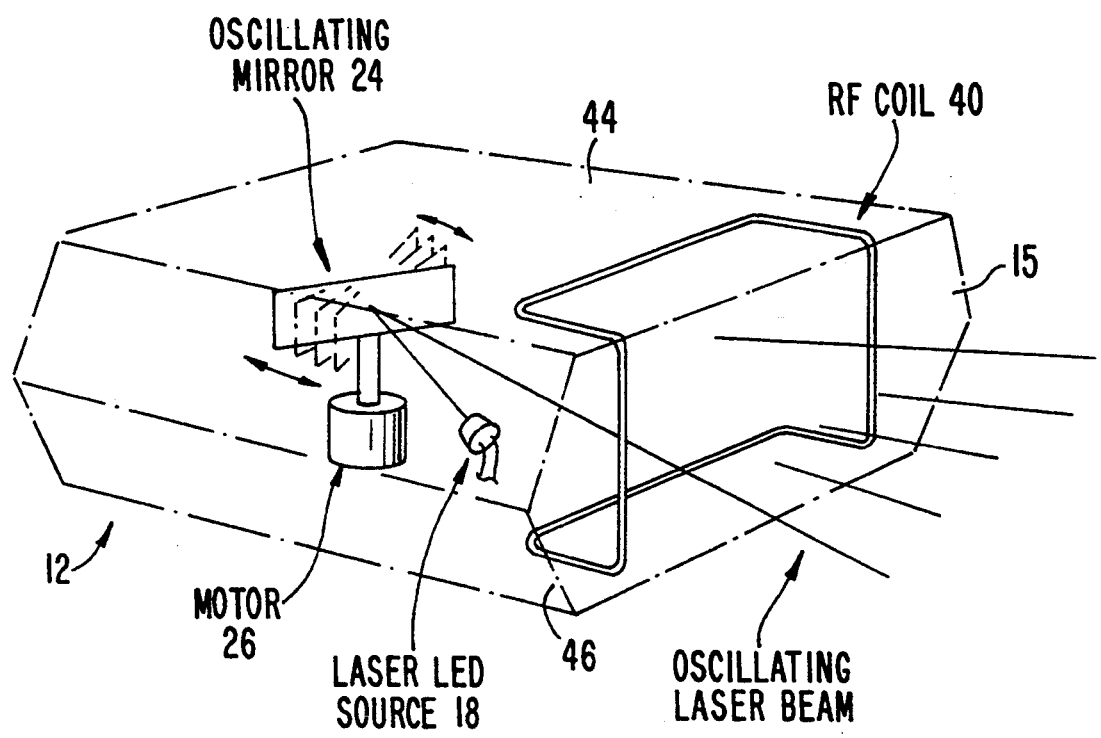

In order to establish the desired radio frequency field for interrogation of the tag and receipt of the identifying signal from the tag or transponder, the coil 40 for the radio frequency tag reader may be placed in any number of orientations so long as neither it nor the circuitry connected thereto is located in the housing 10 so as to obstruct the window 16 and/or the scan of the laser beam by the mirror 24. Various satisfactory orientations for the coil or antenna for the radio frequency reader are shown in FIGS. 3a to 3f. As shown in FIG. 3a, the coil 40 is entirely on the end surface 15 of the elongated portion 12 of the housing 10 which contains the window 16. Thus the coil 40 effectively surrounds the window 16 (as can be seen in FIG. 1), to produce a field in front of the housing 10. With the arrangement of FIG. 3b, the coil 40 extends both on the end surface 15 of the housing as well as on the upper surface 44 of the housing portion 12, to produce the radio frequency field both in front of and on top of the housing 10. According to FIG. 3c, the coil 40 extends on the front end surface 15 and on the bottom surface 46 of the housing portion 12 to produce an RF field in front of and below the housing 10. As shown in FIG. 3d the coil may extend from the end surface 15 around each of the side surfaces 48 or over both the top and bottom surfaces 44 and 46 as shown in FIG. 3f. In each of FIGS. 3a to 3d and 3f it is understood that the portion of the radio frequency coil 40 on the end surface 15 does not extend over the window 16, or at least does not obstruct the scan of the light beam 28 exiting the housing 10 or the reflected light 30 re-entering the housing 10. Instead of the flat coil-type antennas 40 shown in FIGS. 3a to 3d and 3f (even though the flat coils are bent around the side and/or upper and/or lower surfaces), the necessary RF field may be produced by a coil 40' wound on a ferrite core 41 as shown in FIG. 3e. In such case, the core 41 preferably extends transverse to the end surface 15 containing the window 16, but again must be positioned so that it does not physically obstruct the scanned light beam in the window 16.

Turning now to FIG. 4, there is shown the block circuit diagram for the dual hand-held reader as shown in FIGS. 1 and 2. As can be seen, the digital output from the bar code reader 50 is fed via the output cable 36 to the data receiver or host computer 51. The digital output signal from the radio frequency tag reader 52 is likewise fed to this data receiver or computer 51. However, preferably as shown, the digital output signal from the radio frequency reader 52 is first fed to a receiver or microprocessor 54 (which may likewise include a driver circuit) wherein the output signal from the radio frequency reader 52 is converted in a well known and conventional manner, to a digital signal of the same form and format as the output signal from the bar code reader 50. The output signal from this unit 54 is then connected to the output cable 36 which is connected to the data receiver 51. In this way, the output signal from the dual reading head can be fed to a single input port of the data receiver 51 which will then process the data fed in without regard to which of the two readers 50 or 52 was actually used to read the respective tag.

To assure that data from only one of the readers 50 and 52 is being fed to the receiver 51 at any given time, and to enable the selective reading by a user of either a bar code tag or a radio frequency identification tag (transponder), the trigger 38 (FIG. 1) is part of a three position switch 56 for control of the supply of dc power from the dc power source 58 (e.g. a battery) to the respective readers 50 and 52. As indicated, for this purpose, the trigger 38 controls the switch 56 so that it is normally engaged, for example by spring housing with the open contact 56a (whereby neither of the readers 50 and 52 is energized or activated), and which can be depressed to connect the source 58 to the contacts 56b or 56c to selectively supply power to the bar code reader 50 or the radio frequency reader 52, respectively. It should be noted that although a three position trigger-type switch as shown is preferred, the switch for controlling the selective activation of the reader 50 or the reader 52 may be any other type of switch which performs this purpose, for example a switch which is normally in a center OFF position, or even two separate push button switches for the respective readers 50 and 52. The important criterion for such control is that the user, when gripping the dual technology reading head, for example be handle 14, should be able preferably to control the selective activation of the respective readers by movement of a single finger.

It should further be noted that the power source or battery 58, may be within the housing 10 or, if desired, the power source can be located at the data receiver 51, whereby the power would be supplied to the housing 10 by an additional conductor or conductors. Moreover, although the connection between the hand-held reader and the data receiver 51 is preferably via the common output or conductor cable 36, it would be possible to provide an RF transmitter in the housing 10 to transmit the output data signal from the dual reading head to a remotely located data receiver 51 via a radio frequency link at a frequency substantially different than that used by the radio frequency reader 52 so as not to cause any interference.

The invention now being fully described, it will be apparent to one of ordinary skill in the art that any changes and modifications can be made thereto without departing from the spirit or scope of the invention as set forth herein.

What is claimed:

1. A hand-held dual code reading head comprising:
   a hand-held housing having a light transmissive window at one end thereof;
   an actuatable bar code reader disposed in said housing and including a light source for producing a beam of light directed along a path to exit said housing via said window toward a bar-code tag, scanning means for scanning said light beam along a scan line across the bar code tag and a light sensor for detecting the intensity of light from said light beam reflected from a bar code and for producing an electrical signal corresponding thereto;
   an actuatable radio frequency tag reader for producing a radio frequency signal of a first frequency for energizing a radio frequency identification tag and for detecting a radio frequency identifying signal of a second frequency produced by an energized tag and producing a corresponding output signal, said tag reader being disposed in said housing and including a coil which is mounted within the housing at said one end of said housing so as to avoid said light path and circuit means connected to said coil for producing said corresponding output signal; and,
   and means, which are manually actuatable by a user of said reading head, for selectively actuating one of said bar code reader and said radio frequency tag reader.

2. A hand-held dual code reading head according to claim 1 wherein said means comprises switch means positioned on said housing for actuation by a single finger of a user.

3. A hand-held dual code reading head according to claim 2 wherein said switch means comprises a three position switch.

4. A hand-held dual code reading head according to claim 3 wherein said means is a normally OFF three position trigger-like switch.

5. A hand-held dual code reading head according to claim 4 wherein said housing includes an elongated portion including said one end and said window, and a handle portion extending transverse to said elongated portion; and wherein said trigger-like switch is mounted for engagement when said handle portion is gripped by a user of the reading head.

6. A hand-held dual reading head according to claim 2 wherein said switch means is a pair of normally OFF switches, one connected to each of said readers.

7. A hand-held dual reading head according to claim 1 further comprising: further circuit means for converting said output signal from said radio frequency reader to a format corresponding to said output signal from said bar-code reader; and a common output from said reading head for said output signal from said bar-code reader and from said further circuit means.

8. A hand-held dual code reader according to claim 1 wherein said coil is disposed around said light path at said one end of said housing.

9. A hand-held dual reader technology according to claim 1 wherein said coil is wound on a ferrite core which extends transverse to said one end of said housing.

10. A hand-held dual reading head comprising:
    a hand-held housing having a light transmissive window at one end thereof;
    an actuatable bar-code reader, mounted in said housing, for producing a light beam which exits said housing via said window and for detecting light from said beam reflected from a bar code tag to generate a first electrical signal corresponding to bar code data read from the tag;
    an actuatable radio frequency tag reader, mounted in said housing and including a transmit/receive coil mounted adjacent said one end of said housing, for producing a radio frequency signal of a first frequency to energize a radio frequency transponder-type identification tag and for receiving an identifying signal of a second frequency transmitted by an energized radio frequency identification tag to provide a second electrical output signal corresponding to the tag identifying signal in the same signal format as the bar-code data;
    a common signal output for said reading head connected to receive said first and second electrical signals; and
    manually actuatable switch means mounted on said housing for selectively actuating one of said bar-code tag reader and said radio frequency tag reader depending on the type tag to be read.

11. A hand-held dual technology reading head according to claim 10 wherein said housing is gun-shaped and said switch means is a trigger-like normally OFF switch with two ON positions, one for each of said readers.

* * * * *